Feb. 6, 1945.  A. P. FERGUESON  2,369,035
FENDER SHIELD MOLDING
Original Filed Feb. 20, 1941
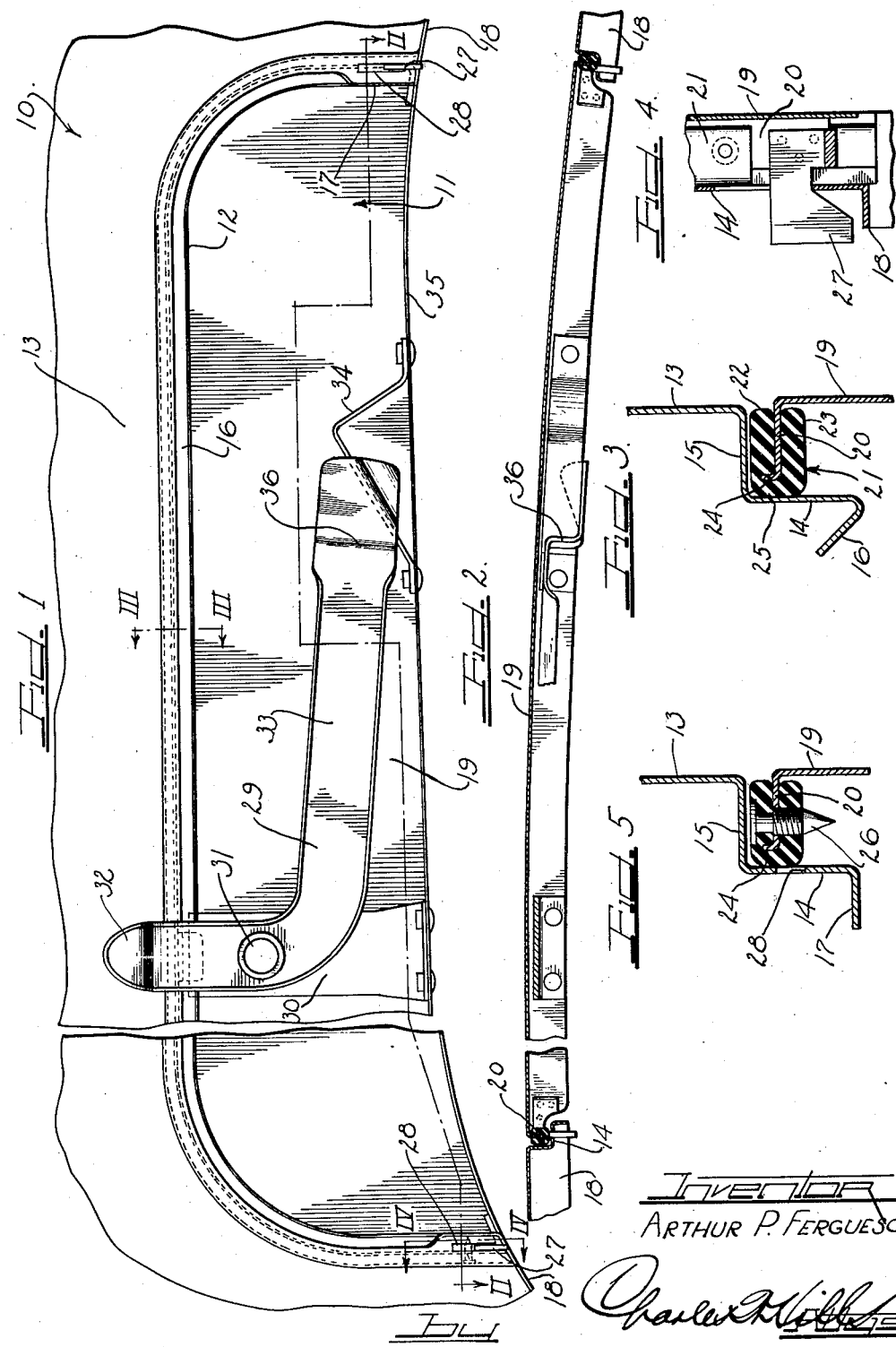
Inventor
ARTHUR P. FERGUESON Patented Feb. 6, 1945

2,369,035

UNITED STATES PATENT OFFICE 2,369,035

FENDER SHIELD MOLDING

Arthur P. Fergueson, Detroit, Mich., assignor to Houdaille-Hershey Corporation, Detroit, Mich., a corporation of Michigan Original application February 20, 1941, Serial No. 379,765. Divided and this application October 6, 1941, Serial No. 413,803

4 Claims. (Cl. 280—153)

This invention relates to a fender shield, and more particularly, to a fender shield molding or cushioning element and to means for securing the molding on a fender shield.

As the term "fender shield" shall hereinafter be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

In the automobile industry it is generally considered desirable to provide an accessary element, such as a fender shield, with some sort of molding or cushioning element where the accessory contacts the outer surface of the vehicle body. This is usually referred to as preventing a "direct metal to metal contact" between the accessory and the vehicle body. The advantage of such a molding is two-fold, namely, it prevents scratching or marring of the outer finished surface of the automobile and thus permits the vehicle to be used without the accessory when so desired, and second, it tends to eliminate any noise or rattling when the vehicle is traveling over a very rough surface.

Moldings were employed on fender shields at a relatively early date of the development of this particular art and have assumed a wide variety of shapes and have been secured to the fender shield in a wide variety of manners. Due to the fact that rubber and other similar cushioning material tends to stick to a metal surface, particularly after weathering for some time, and it also tends to freeze to the metal surface due to dampness during the winter months, it has frequently been found that these rubber moldings or other cushioning elements will tear loose from the fender shield and thus become very unsightly and useless to perform their intended functions.

It is an object of the present invention to provide a fender shield molding of novel design which may be fastened more securely to the marginal edge of the fender shield than has been possible with moldings previously known to the art.

It is a further object of the present invention to provide a novel method and means of securing a molding to a fender shield.

It is a still further object of the present invention to provide a novel combination fender shield and molding.

Another object of the present invention is to provide a fender shield and molding in which a marginal edge of the fender shield has a sharply bent lip portion within the molding and entirely surrounded by the molding.

Another and still further object of the present invention is to provide a fender shield and molding having means for securing the molding to the shield including drive screws which are driven through the molding and the shield.

The novel features which I believe to be characteristic of my invention are set forth with particularity in the appended claims. My invention itself, however, both as to its organization and manner of construction, together with further objects and advantages thereof, will best be understood by reference to the accompanying drawing, in which:

Figure 1 is a rear elevational view of a fender shield assembly, and in which a fender shield is shown in mounted position on a vehicle fender;

Figure 2 is a generally horizontal sectional view of the fender shield assembly, as taken along the irregular section line II—II of Figure 1;

Figure 3 is a greatly enlarged sectional view of the upper portion of the fender shield assembly, as taken along the line III—III of Figure 1;

Figure 4 is a vertical sectional view as taken along the section line IV—IV of Figure 1; and, Figure 5 is an enlarged sectional view to the same scale as Figure 3, as taken along the line V—V of Figure 4, and showing the manner in which the cushioning element or molding is secured at its ends to the fender shield.

This application is a division of my co-pending application for "Fender shield construction" Serial No. 379,765 filed February 20, 1941, Patent No. 2,312,536, March 2, 1943, and assigned to the same assignee.

Referring now to the various figures of the drawing, which illustrate one embodiment of the present invention, there is illustrated therein a vehicle fender 10 having a fender shield 11 mounted thereon over the wheel opening 12 in the outer depending side wall 13 of the fender 10. In order to permit the fender shield 11 to be mounted so that its edge does not directly engage the outer depending side wall 13 of the fender 10, the fender 10 is provided with an offset shoulder 14 which is integrally connected to the depending wall portion 13 by a connecting flange 15. The shoulder 14 has its peripheral edge folded back on itself in an open fold as at 16 to reinforce and stiffen the offset shoulder 14 around its free edge. It will be noted from an inspection of Figure 1 that the folded back peripheral portion extends substantially completely around the opening 12 but terminates just short of the lower corners of the opening. It will further be observed that the marginal edge of the fender shield adjacent the two lower corners of the opening is folded directly rearwardly as at 17 (see Figure 5). The depth of the connecting flange 15 is such that the fender shield 11 is seated on the offset shoulder 14 in such a manner that the outer face of the fender shield 11 is substantially flush with the outer face of the depending wall 13 of the fender 10.

The lower edge of the fender 10 is provided with a rearwardly extending flat flange 18 which merges with the portion 17 at the lower corners of the opening 12. It will also be understood from an inspection of Figure 1 that the portion 17 gradually merges into the portion 16 at a short distance above the lower corners of the opening 12.

The fender shield 11 comprises a sheet metal panel 19 which bulges very slightly outwardly (see Figure 2), and which is large enough to cover the wheel opening 12 as well as to overlie and be seated on the offset shoulder 14. More specifically, the panel 19 is dimensioned to be positioned snugly within the connecting flange 15 and to be seated on the offset shoulder 14 of the fender 10. The top and end edges of the fender shield 11 are bent back into a flange portion 20 upon which is mounted a cushioning bead or rubber molding 21. The rubber molding or cushioning bead is shaped to overlie the outer face of the flange 20 and also to overlie the inner face of the flange 20 in portions 22 and 23, respectively. As an inspection of Figure 3 will show, the rear edge of the flange 20 is bent out as at 24 to provide a lip portion for aiding and retaining the rubber molding 21 on place on the fender shield 11. It will further be observed that the rubber molding 21 extends around this lip portion 24 and completely covers it to provide an abutment portion 25 of the molding which is arranged to be directly seated on the offset shoulder 14 of the fender 10. The molding 21 is secured to the fender shield 11 by a pair of drive screws 26 which are driven through the rubber molding 21 as well as through the flange 20. More specifically, the drive screw 26 is driven first through the outer portion 22 of the rubber molding 21, then through the metal flange 20 of the fender shield 11 and finally through the inner portion 23 of the rubber molding 21. This provides a very tight and secure engagement of the rubber molding 21 on the fender shield 11.

It will further be observed from an inspection of Figures 3 and 5 of the drawing that the sharply bent lip portion 24 of the flange 20 extends at right angles or transversely to the direction of the removal force of the fender shield away from the fender. Because of this fact, and also because of the fact that this lip portion 24 is embedded within the rubber molding 21, a positive means is provided for separating the rubber molding 21 from the shoulder 14 of the fender 10. This is particularly effective due to the fact that the sharply bent lip portion 24 within the rubber molding 21 extends substantially entirely around the peripheral edge of the fender shield over which the rubber molding is secured.

For reasons which will at once be apparent to those skilled in the art, the inner portion 23 of the rubber molding 21 is cut away at the two lower corners of the fender shield as may be seen for example in Figure 4, and is also cut away at the top of the fender shield opposite the latching mechanism.

The supporting and latching mechanism for the fender shield 11 is described in detail and claimed in my copending application Serial No. 379,765 of which this is a divisional application. For the purposes of this application, it is sufficient to say that the fender shield 11 is provided with a pair of hook arms 27 at the two lower corners of the fender shield 11 which are arranged to extend through appropriate slots 28 in the offset shoulder 14 at the two lower corners of the opening 12 and provide both vertical support and lateral restraint for the fender shield on the fender. In addition to the hook arm 27, a dog-leg latching lever 29 is pivotally mounted on a strut 30 secured to the rear of the fender shield. The dog-leg latching lever 29 is carried on a pivot pin 31 which is supported by the strut 30. The upper or short leg 32 of the lever 29 is arranged to be rocked into and out of engagement with the folded edge 16 of the fender 10. The lower long leg portion 33 of the lever 29 is arranged to be grasped by the hand of the operator and rocked as desired. An L-shaped metal bracket 34 is secured to the lower base flange 35 of the fender shield 11 and is arranged to have the lower end of the handle portion 33 seated thereon when the lever 29 is in latching position, the lower end being folded as indicated at 36.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A fender shield having a flange, a yieldable molding covering both sides and the edge of said flange, a portion of said flange being longitudinally and sharply bent within said molding, thereby to restrain separation of said molding from said flange, and drive screws extending through the molding on both sides of said flange and through said flange.

2. A fender shield having a flange, a yieldable molding extending over both sides of said flange, and drive screws extending through the molding on one side of said flange, then through the said flange, and finally through the molding on the opposite side of said flange.

3. A fender shield having a flange, a yieldable molding extending over both sides of said flange, and drive screws extending through the molding on one side of said flange, then through said flange, and finally through the molding on the opposite side of said flange, said molding on one side of said flange being countersunk to receive the head of said drive screw below the outer surface of said molding.

4. A fender shield having a flange of L-shape transverse cross section, and a yielding molding, said molding having a longitudinally extending slot of L-shape transverse cross section, said flange being snugly seated in the slot of said molding, and a plurality of drive screws driven through said molding and said flange, whereby said molding is tightly secured to said flange.

ARTHUR P. FERGUESON.